United States Patent
Creamer et al.

(10) Patent No.: US 7,092,738 B2
(45) Date of Patent: Aug. 15, 2006

(54) NAVIGATION OF INTERACTIVE VOICE RESPONSE APPLICATION USING A WIRELESS COMMUNICATIONS DEVICE GRAPHICAL USER INTERFACE

(75) Inventors: Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/324,955

(22) Filed: Dec. 20, 2002

(65) Prior Publication Data

US 2004/0121814 A1    Jun. 24, 2004

(51) Int. Cl.
*H04N 1/00* (2006.01)
*H04N 1/38* (2006.01)
(52) U.S. Cl. .................. 455/563; 455/566
(58) Field of Classification Search ............. 455/566, 455/563, 556.1, 414.1, 406, 408, 550.1, 466, 455/456.1, 456.3, 1; 379/93.23, 114.05, 379/201.02, 201.01, 93.17, 88.13; 704/270.1, 704/275; 705/26, 15; 709/224
See application file for complete search history.

(56) References Cited

U.S. PATENT DOCUMENTS

| | | | |
|---|---|---|---|
| 5,802,526 A * | 9/1998 | Fawcett et al. .......... | 379/88.13 |
| 5,937,040 A | 8/1999 | Wrede et al. ............ | 379/93.23 |
| 6,295,342 B1 | 9/2001 | Kaminsky ................ | 379/88.23 |
| 6,418,199 B1 | 7/2002 | Perrone ................... | 379/88.01 |
| 6,556,668 B1 * | 4/2003 | Achuthan et al. ...... | 379/114.05 |
| 6,748,066 B1 * | 6/2004 | Espejo et al. ............ | 379/114.2 |
| 6,920,431 B1 * | 7/2005 | Showghi et al. .............. | 705/15 |
| 2002/0085701 A1 * | 7/2002 | Parsons et al. ........ | 379/211.01 |
| 2003/0028380 A1 * | 2/2003 | Freeland et al. ............ | 704/260 |
| 2003/0119478 A1 * | 6/2003 | Nagy et al. ................. | 455/406 |
| 2003/0149557 A1 * | 8/2003 | Cox et al. ...................... | 704/2 |
| 2004/0019564 A1 * | 1/2004 | Goldthwaite et al. ......... | 705/44 |
| 2004/0029565 A1 * | 2/2004 | Shibata et al. .............. | 455/411 |
| 2004/0087347 A1 * | 5/2004 | Minear et al. .............. | 455/566 |
| 2004/0111269 A1 * | 6/2004 | Koch ......................... | 704/275 |
| 2004/0120479 A1 * | 6/2004 | Creamer et al. ......... | 379/88.22 |
| 2004/0122941 A1 * | 6/2004 | Creamer et al. ............ | 709/224 |
| 2004/0203634 A1 * | 10/2004 | Wang et al. ............. | 455/556.1 |
| 2004/0204116 A1 * | 10/2004 | Ben-Efraim et al. ........ | 455/566 |

* cited by examiner

*Primary Examiner*—Aung Moe
(74) *Attorney, Agent, or Firm*—Akerman Senterfitt

(57) ABSTRACT

A method and machine readable storage for facilitating communications between a user and an interactive voice response (IVR) application. The method includes the step of configuring to be displayed on a wireless communications device having a graphical user interface (GUI) at least one menu which includes user selectable options correlating to available IVR options. Responsive to a communications link being established between the wireless communications device and the IVR application, the menu is forwarded to the wireless communications device for presentation to the user on the GUI. A user selection is received via the GUI and an IVR operation is performed corresponding to the menu selection.

24 Claims, 4 Drawing Sheets

NAVIGATION OF INTERACTIVE VOICE RESPONSE APPLICATION USING A WIRELESS COMMUNICATIONS DEVICE GRAPHICAL USER INTERFACE

BACKGROUND OF THE INVENTION

1. Technical Field

This invention relates to the field of telephone communications and, more particularly, to interactive voice response applications.

2. Description of the Related Art

The advent of interactive voice response (IVR) applications for use in telephone systems has reduced operating costs for many types of businesses by reducing telephone related staffing requirements. Such IVR applications typically answer incoming telephone calls and present to callers audible menus of selectable options which are available to the callers. The callers usually make menu selections in one of two ways: depressing a key or sequence of keys on a touch tone keypad; or issuing a spoken utterance.

Often times a plurality of hierarchically related menu layers are presented which a caller must navigate while searching for a desired IVR option. Navigating through such menus can be time consuming and frustrating, especially when the caller makes an incorrect selection during the navigation process. Consequently, callers often hang up prior to successfully navigating the menus or opt out of the menu system in an attempt to speak with an operator. Particularly concerning are the cases in which potential customers or clients hang up in frustration.

SUMMARY OF THE INVENTION

The invention disclosed herein provides a method and a machine readable storage for enabling a user to visually navigate an interactive voice response (IVR) application using a wireless communications device which incorporates a graphical user interface (GUI). For example, the wireless communications device can be a personal digital assistant having a touch screen. The method includes the step of configuring at least one menu to be displayed on the wireless communications device. The menu can be dynamically configured based at least in part upon available user information and available system information.

A communication link between the wireless communication device and the IVR application can be disconnected after the menu is received by the wireless communication device. The communication link then can be reestablished after the user has made a menu selection.

The menu includes user selectable IVR options. The menu can be presented to the user when a communications link is established between the wireless communications device and the IVR. In one arrangement, the menu can be a hierarchical menu. An indication of IVR options which are currently unavailable can be provided within the menu. Further, IVR options which are currently unavailable can be removed from the menu.

The user can select an IVR option by entering a response using the GUI. In one arrangement, a selection can be made using a cursor, stylus or a human appendage, such as a finger. A signal correlating to the menu selection then can be forwarded to the IVR application. In response to the menu selection, the IVR application can perform an IVR operation corresponding to the menu selection. For example, the IVR application can connect an IVR end of the communications link to a communication extension. If the user makes an improper menu selection, the IVR application can provide a correlating response to the wireless communications device.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a system and a method for enabling a user to visually navigate an interactive voice response (IVR) application using a graphical user interface (GUI) provided with a wireless communications device. In particular, when the user establishes a communications link between the wireless communications device and an IVR system, a menu of IVR options can be presented to the user on the GUI. The user can select an IVR option by entering a response into the wireless communications device using the GUI. A signal correlating to the menu selection then can be forwarded to the IVR application, which can initiate an IVR operation correlating to the menu selection. Importantly, the present invention streamlines the IVR menu selection process, thereby reducing call duration. In consequence, communication costs can be reduced.

Figure 1:
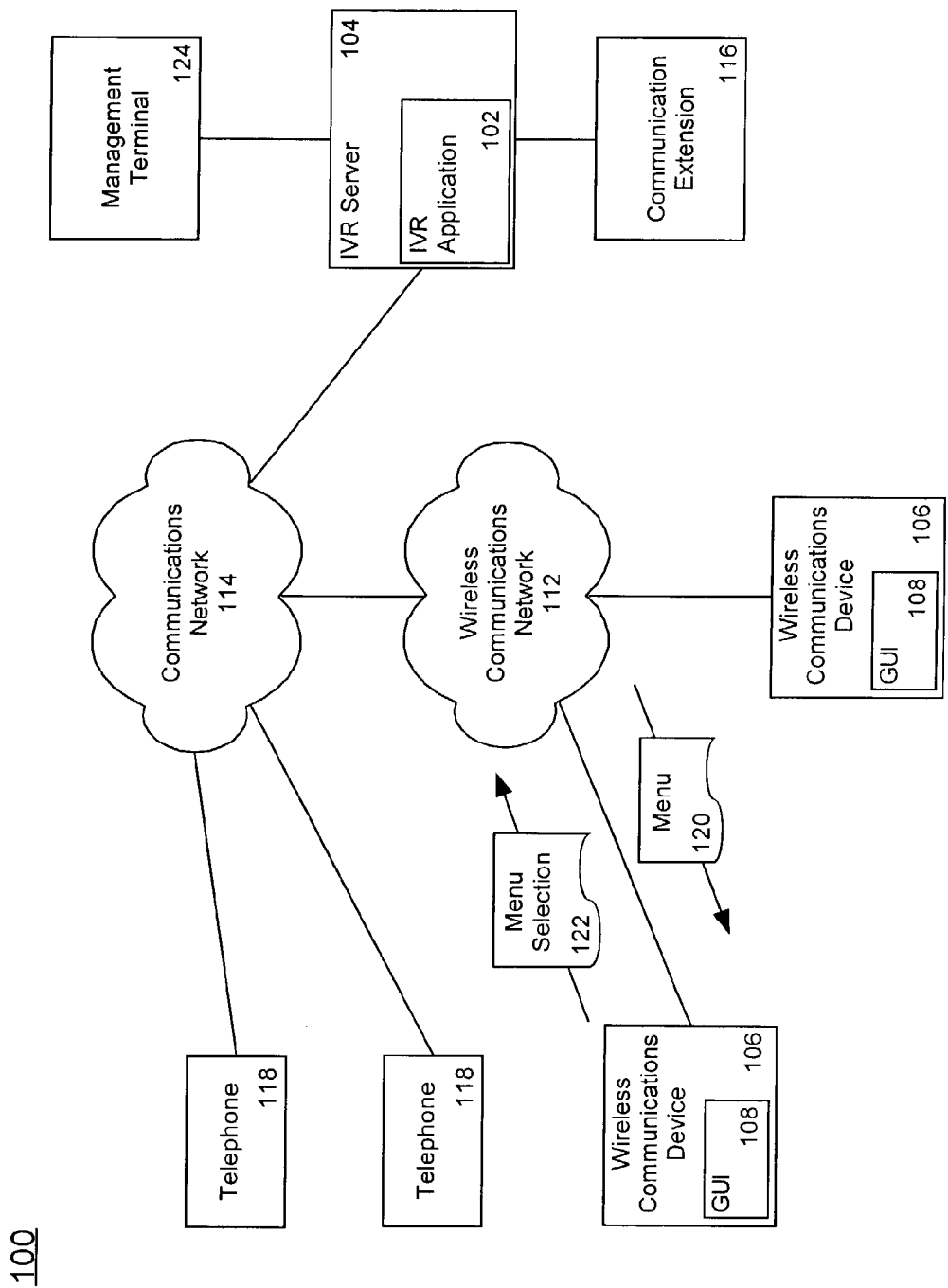
FIG. 1 is a schematic diagram illustrating an exemplary communication system incorporating an interactive voice response (IVR) application which provides menu selection via a wireless communications device in accordance with the inventive arrangements disclosed herein.

Referring to FIG. 1, a schematic diagram is presented which illustrates an exemplary communication system 100 incorporating an IVR application that provides menu selection via a wireless communications device. The system 100 can include an IVR application 102 executing on an IVR server 104. The IVR server can be operatively connected to a communications network 114, for example a local area network (LAN), a wide area network (WAN), the Internet, a public switched telephone network (PSTN), a public switched packet network (PSPN), or any other network that can carry data communications. The communications network 114 can provide a communications link between the IVR application 102 and landline communication devices, for instance telephones 118. The telephones 118 can establish an audio and/or data communications link with the communications network 114 over conventional landlines.

Further, the IVR server 104 can be operatively connected to a wireless communications network 112 to enable communications between the IVR application 102 and wireless communications devices 106, for example personal digital assistants (PDA's), mobile telephones, wireless video phones, or any other communication devices that communicate wirelessly. In one arrangement, the IVR server can be connected to the wireless communications network 112 via the communications network 114, as shown in FIG. 1. In another arrangement, the IVR server can be directly connected to the wireless communications network 112.

The wireless communications devices 106 each can include a graphical user interface (GUI) 108. In one embodiment, the GUI's 108 can be presented on touch screens to facilitate user selection of menu items presented on the GUI's 108 using a stylus or human appendage, such as a finger. The invention is not so limited, however. For example, the GUI's 108 also can be presented on other displays, for instance a liquid crystal display (LCD), a plasma display, or a cathode ray tube (CRT). In such instances a cursor can be used to select menu items.

Visually examining a menu presented on a display reduces call duration because it is much more efficient than listening to an audibly presented menu, especially when a menu incorporates multiple hierarchical tiers. Rather than audibly listening to each menu option presented, the present invention enables a user to quickly visually identify and select relevant menu options. Additionally, in contrast to conventional IVR applications which typically require a user to memorize numbers correlating to menu options in order to make a menu selection, the present invention enables a user to view menu option descriptions while making the menu selections. Accordingly, the present invention eliminates the risk of a user forgetting which number correlates to a particular menu option, thereby saving additional time.

A communications link can be established between a wireless communications device 106 and the IVR application 102. According to one embodiment, for example in the case of a wireless and/or cellular telephone, a wireless audio communications link can be established. That is, the wireless communications device 106 can establish a telephone call by dialing a number associated with the IVR server 104. Accordingly, data can be exchanged between the wireless communications device 106 and the IVR application 102 using modem technology. Alternatively, the wireless communications device 106 can establish a data communications link with the IVR application 102. For example, the wireless communications device 106 can access a network address corresponding to the IVR server 104 and communicate using a suitable protocol for wireless communications, such as Wireless Application Protocol (WAP), Short Message Service (SMS), Session Initiation Protocol (SIP), or the like.

Over the established communications link a menu 120 of IVR options can be forwarded from the IVR application 102 to the wireless communications device 106 for presentation to a user on the GUI 108. The IVR options can correlate to IVR navigational branches and IVR actions, for example operations such as initiating a function. A user can make a menu selection using the GUI 108. When an IVR option is selected, the menu selection 122 then can be forwarded to the IVR application to initiate performance of an operation in accordance with the menu selection. For example, the IVR application can connect an IVR end of the communications link to a particular communication extension 116, connect an IVR end of the communications link to another application or menu, activate an additional menu, disconnect the wireless communications device from the IVR system, evaluate conditions present, or perform some other operation.

In one arrangement, the communication link between the communications device 106 and the IVR application 102 can be disconnected while the user peruses the menu 120 of IVR options. The communication link then can be reestablished after a menu selection 122 has been made. Accordingly, significant cost savings can be realized by minimizing the amount of time a wireless communication link is maintained over the wireless communications network 112. Moreover, IVR resources, which would otherwise be utilized while a user makes a menu selection, can be made available for other IVR traffic while the user is offline.

A management terminal 124 can be used to configure IVR response functionality within the communication system 100. Further, the IVR application can include a provisioning interface to enable menu construction and entry of IVR menus into the IVR application 102. For instance, a menu construction module and a GUI can be provided within the IVR application. Menu construction tools can be provided within the menu construction module to facilitate menu construction, as is known to those skilled in the art of programming software applications. The provisioning interface can further include a programming language interface and/or macro tools which enable functions to be associated with IVR menus and IVR menu options. Notably, the functions can include commands, logical operators, conditional statements, and any other code used in computer programming.

Figure 2A:
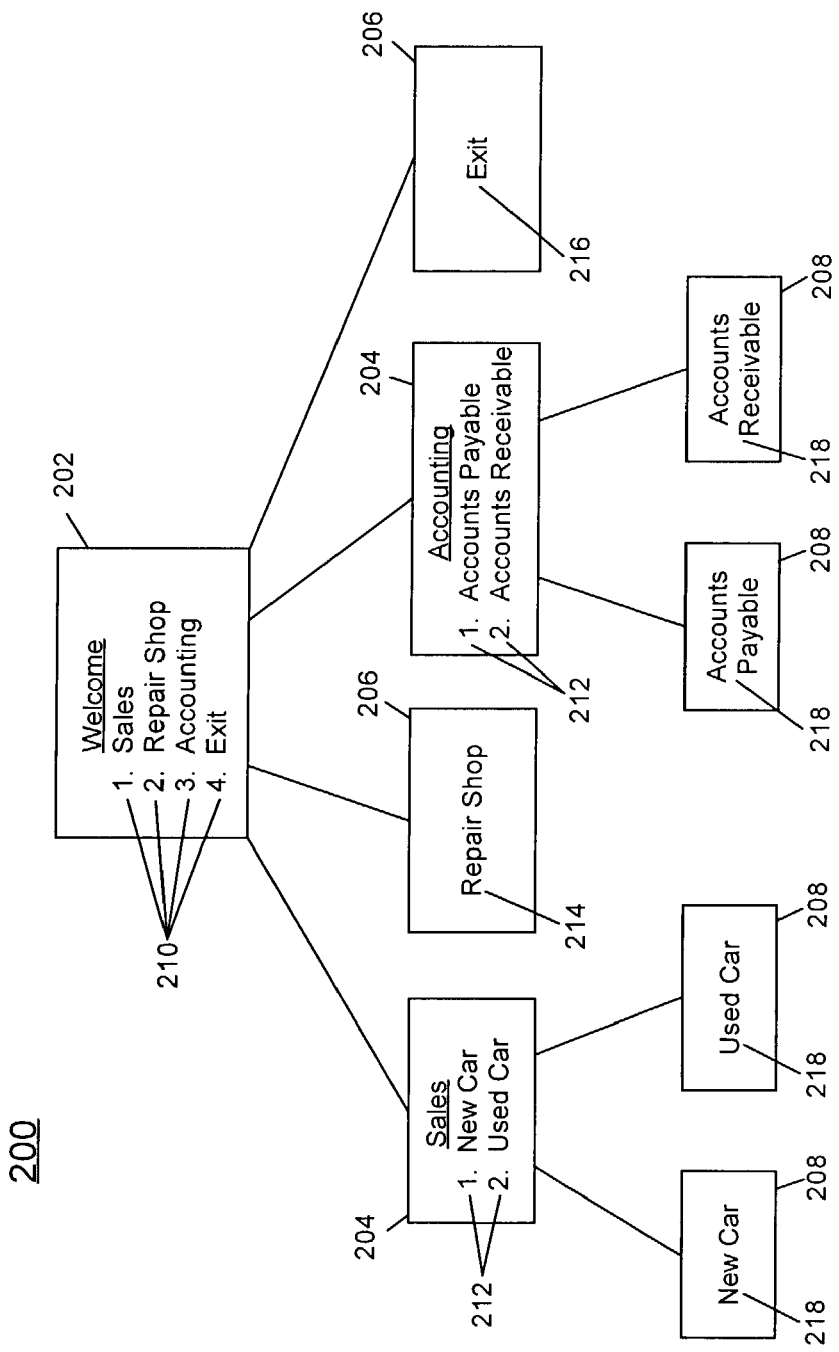
FIG. 2A is a schematic diagram illustrating a view of an IVR menu which can be presented on a graphical user interface of a wireless communications device in accordance with the present invention.

An exemplary IVR menu 200 is illustrated in FIG. 2A. The menu 200 is shown with a hierarchical structure having leaves presented in parent/child relationships. It should be noted that the various menus disclosed herein are shown for purposes of illustration only. Accordingly, the present invention is not limited by the particular menus presented herein. Rather, those skilled in the art will recognize that any of a variety of different menus can be used. For example, the menus can be any menu type, can have any menu structure, and can be presented with any number of levels.

The exemplary menu 200 can include a variety of leaves 202, 204, 206, 208 containing IVR options 210, 212, 214, 216, 218. For example, leaf 202 can be presented with navigational IVR options 210 which identify various child leaves 204, 206 associated with the leaf 202. Other leaves, for example leaf 206, can be presented with action IVR options 214 which, when selected, cause a specific operation to initiate. Importantly, action IVR options 214, 216, 218 within any leaves can be selected directly without requiring selection of IVR options from leaves higher in the hierarchical structure, such as the parent leaves 204 or grandparent leaf 202. Accordingly, a user need not spend unnecessary time selecting an IVR option in the parent leaf 202, 204 if that option is merely a navigational IVR option.

Nonetheless, the navigational IVR options can be selectable, for example to navigate to portions of a menu which are not currently displayed. In one arrangement, in the case that a particular menu is too large to be presented in a single instance, sub-menus can be provided which are linked to navigational IVR options. The sub-menus can be activated by the user when needed, for example by selecting a particular navigational IVR option which is linked to the sub-menu. Still, the sub-menus can be activated in other ways, for example by selecting an icon representing the sub-menu, selecting a key representing the sub-menu, or any other method which can be used to activate a sub-menu.

Figure 2B:
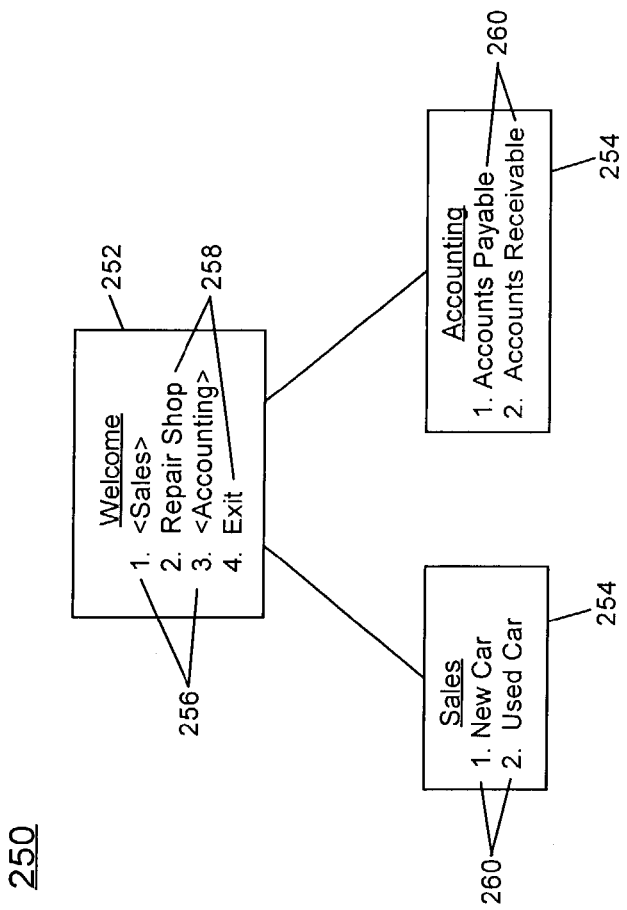
FIG. 2B is a schematic diagram illustrating another view of an IVR menu which can be presented on a graphical user interface of a wireless communications device in accordance with the present invention.

FIG. 2B illustrates another exemplary menu 250 in accordance with the present invention. The menu 250 can be displayed with both navigational IVR options 256 and action IVR options 258 presented in a parent leaf 252. In this arrangement, the action IVR options 258 can be selected directly from within the parent leaf 252. Accordingly, child leaves 254 need only be presented for the navigational IVR options 256, corresponding to "Sales" and "Accounting" in the present example. Further, a visual indicator can be presented to identify the navigational IVR options 256. For example, the navigational IVR options 256 can be displayed with some form of indication that they are linked to child leaves, such as additional characters, a font which is different than other IVR options, a background color that is unique from other IVR options, or any other indicator which can be used for IVR option identification. Alternatively, the action IVR options 258 can be presented with a unique indicator to signify that they can be selected to initiate an operation. Nonetheless, those skilled in the art will appreciate that there are a myriad of visual indicators within the scope of the present invention that can be used to distinguish the navigational IVR options 256 and the action IVR options 258.

In one arrangement, the menus can be dynamically configured based at least in part upon available user information and system information. For example, a menu can include only IVR options associated with communication extensions which are presently active and that are manned by persons speaking the user's preferred language. For example, if there are eight sales persons in a particular office that speak Spanish, but four of them are out of the office, the menu can be dynamically configured to only show the IVR options correlating the extensions for the Spanish speaking salespersons that are in the office. Alternatively, an indication can be presented to alert the user to which extensions are available, for example using a visual cue. For instance, the appearance of IVR options correlating to the extensions of salespersons who are out of the office can be changed. Nonetheless, any of a variety of visual indicators that can be provided within the scope of the present invention.

If a user selects an IVR option that is not currently available, the IVR application can provide an error response to the user to notify the user that an incorrect menu selection has been made. For example, the IVR application can send a response to the wireless communications device for presentation to the user after the IVR application receives an incorrect menu selection. The error response can be an audible signal, a visual indicator, or any indication that an incorrect menu selection has been made.

Notably, menus can be optimized for specific users, classes of users, user locations, dates, times, or any other circumstance that can affect IVR navigation or communications link routing. For example, the IVR application can include a program module which determines a region from which a user is calling. Regional determination can be based upon telephone number, nodes being used in the communication network linking the user to the IVR application, or any other location identification method. Users from an English speaking country can be presented menus in English, while users from Spanish speaking countries can be presented menus in Spanish. The menu selections also can be optimized for the user. For instance, if a user is from a Spanish speaking country, menu selections representing communications links can be limited to telephone extensions of Spanish speaking persons.

In addition to IVR options for menu navigation and communications links, additional IVR options can be provided. For example, IVR options can be provided for language selection. The additional IVR options can be activated when needed, for instance, by a user selection of a particular check box in the GUI. This feature can be a beneficial feature for travelers who use wireless communications devices in foreign countries.

Figure 3:
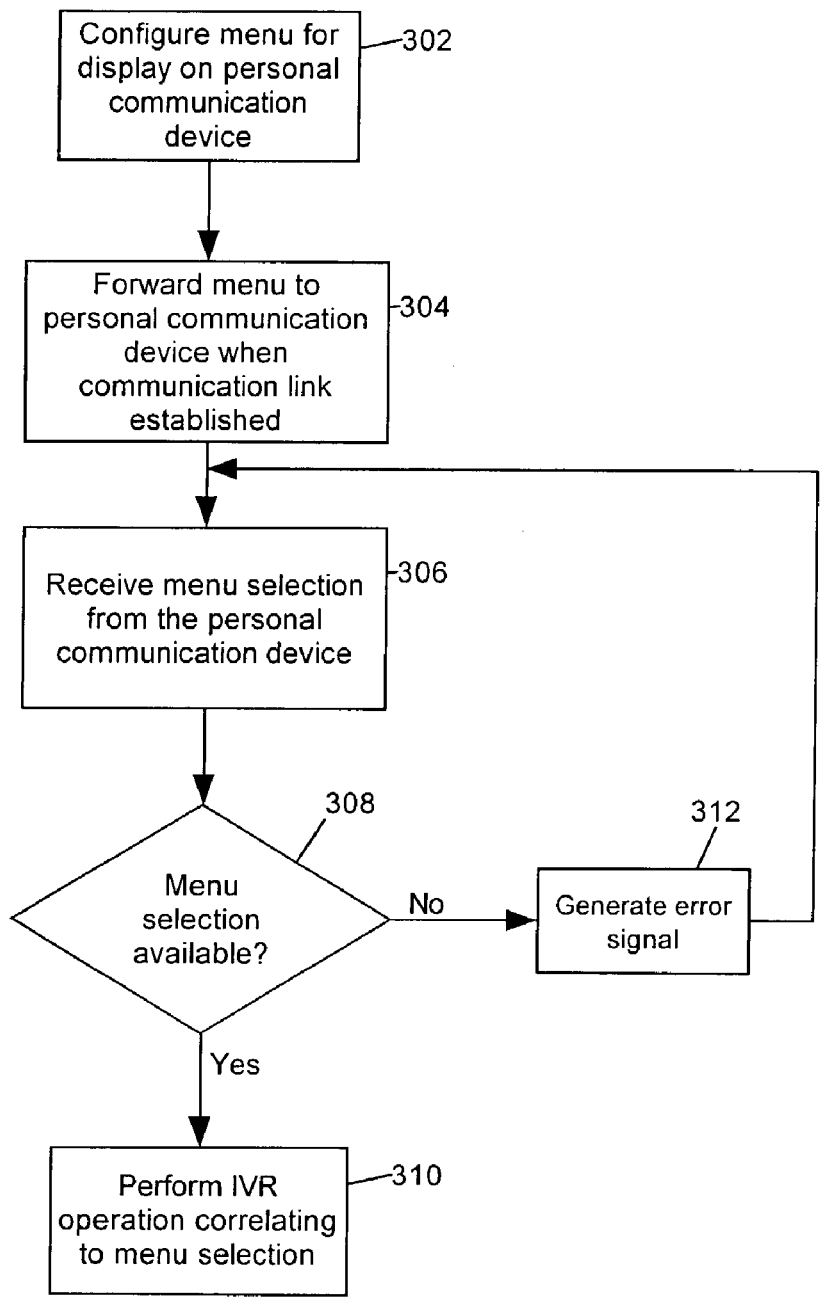
FIG. 3 is a flow chart illustrating a method of providing user navigation within an IVR application using the system of FIG. 1.

Referring to FIG. 3, a flow chart 300 is presented which illustrates a method of providing user navigation within an IVR application in accordance with the present invention. The method includes the step of configuring a menu for display on a wireless communications device as shown in step 302. In one arrangement, menus can be dynamically built from the IVR application. For example, if the IVR application incorporates scripted user prompts, for instance using a voice extensible markup language (VXML) application, then the user prompts can be dynamically parsed from the script and used to build the menu.

Referring to step 304, after a communications link has been established between a wireless communications device and an IVR application, the menu can be forwarded to the wireless communications device. After a menu selection has been made, for example by a user using the wireless communications device, the IVR application can receive the menu selection from the wireless communications device, as shown in step 306. As noted, a user can directly select menu options at any node of a menu hierarchy, thereby relieving a user from navigating complicated menu structures to make a menu selection. Referring to decision box 308 and step 310, if the menu selection is available then the IVR application can perform an operation correlating to the menu selection, for example forwarding a call from a personal digital assistant to a particular communication extension. If a menu selection has been made that does not correlate to an available option, an error signal can be generated, as shown in step 312, and the IVR application can wait for a next menu selection.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for facilitating communications between a user and an interactive voice response (IVR) application comprising the steps:

determining a region from which said user is calling;

configuring to be displayed on a wireless communications device having a graphical user interface (GUI) at least a portion of a menu comprising user selectable IVR options;

responsive to a communications link being established between said wireless communications device and said IVR application;

presenting communication extentions in said menu with links corresponding to a language of said region;

forwarding said menu to said wireless communications device for presentation to said user on said GUI;

receiving a user menu selection via said GUI; and performing an IVR operation corresponding to said menu selection.

2. The method according to claim 1, further comprising the steps:

disconnecting said communication link after said menu is received by said wireless communication device; and reestablishing said communication link after said user has made said menu selection.

3. The method according to claim 1, wherein said performing step further comprises connecting an IVR end of said communications link to a communication extension.

4. The method according to claim 1, wherein said configuring step further comprises dynamically configuring said menu based at least in part upon available user information.

5. The method according to claim 4, wherein said configuring step further comprises dynamically configuring said menu based at least in part upon available system information.

6. The method according to claim 1, wherein said menu is a hierarchical menu.

7. The method according to claim 1, wherein said wireless communications device is a personal digital assistant.

8. The method according to claim 1, wherein said GUI comprises a touch screen.

9. The method according to claim 1, wherein said user menu selection is made using at least one of a stylus and a human appendage.

10. The method according to claim 1, further comprising the step of providing within said menu an indication of IVR options which are currently unavailable.

11. The method according to claim 1, further comprising the step of removing IVR options which are currently unavailable from said menu.

12. The method according to claim 1, further comprising the step of said IVR application providing a response to said wireless communications device upon the occurrence of an improper user selection.

13. A machine-readable storage having stored thereon, a computer program having a plurality of code sections, said code sections executable by a machine for causing the machine to perform the steps of:

determining a region from which said user is calling;

configuring to be displayed on a wireless communications device having a graphical user interface (GUI) at least a portion of a menu comprising user selectable IVR options;

responsive to a communications link being established between said wireless communications device and said IVR application;

presenting communication extentions in said menu with links corresponding to a language of said region;

forwarding said menu to said wireless communications device for presentation to said user on said GUI;

receiving a user menu selection via said GUI; and performing an IVR operation corresponding to said menu selection.

14. The machine-readable storage of claim 13, further comprising the steps:

disconnecting said communication link after said menu is received by said wireless communication device; and reestablishing said communication link after said user has made said menu selection.

15. The machine-readable storage of claim 13, wherein said performing step further comprises connecting an IVR end of said communications link to a communication extension.

16. The machine-readable storage of claim 13, wherein said configuring step further comprises dynamically configuring said menu based at least in part upon available user information.

17. The machine-readable storage of claim 13, wherein said configuring step further comprises dynamically configuring said menu based at least in part upon available system information.

18. The machine-readable storage of claim 13, wherein said menu is a hierarchical menu.

19. The machine-readable storage of claim 13, wherein said wireless communications device is a personal digital assistant.

20. The machine-readable storage of claim 13, wherein said GUI comprises a touch screen.

21. The machine-readable storage of claim 13, wherein said user menu selection is made using at least one of a stylus and a human appendage.

22. The machine-readable storage of claim 13, further comprising the step of providing within said menu an indication of IVR options which are currently unavailable.

23. The machine-readable storage of claim 13, further comprising the step of removing IVR options which are currently unavailable from said menu.

24. The machine-readable storage of claim 13, further comprising the step of said IVR application providing a response to said wireless communications device upon the occurrence of an improper user selection.

* * * * *